Figures 1, 2:
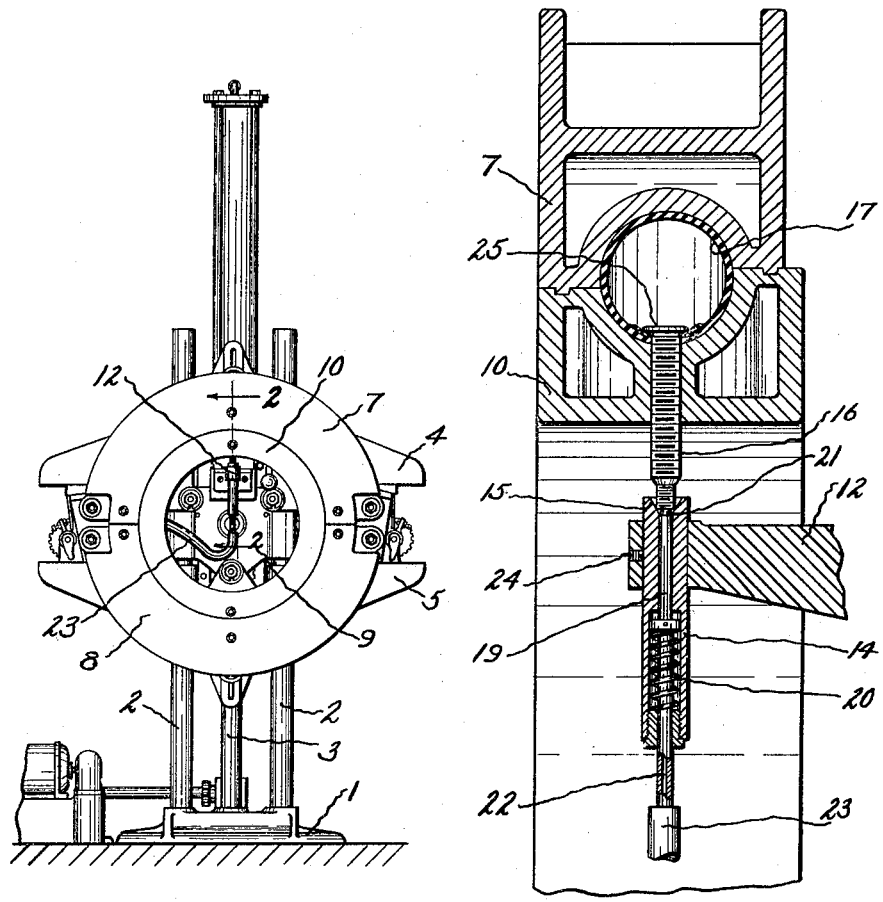

Sept. 13, 1932. C. E. MAYNARD 1,876,714
FLUID PRESSURE CONNECTION
Original Filed Feb. 23, 1928

INVENTOR.
CHARLES EDGAR MAYNARD
BY
ATTORNEY.

Patented Sept. 13, 1932

1,876,714

UNITED STATES PATENT OFFICE

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

FLUID PRESSURE CONNECTION

Original application filed February 23, 1928, Serial No. 256,078. Divided and this application filed September 24, 1928. Serial No. 307,853.

My invention relates to fluid pressure connections such as are used in the vulcanization of inner tubes for pneumatic tires, pneumatic tire casings, bicycle tires and other hollow rubber articles cured under internal fluid pressure. While the embodiment of my invention below described is peculiarly adapted for use with vulcanizers for molding and curing annular rubber tubes such, for example, as the vulcanizer shown in my copending application Serial Number 256,078, filed February 23, 1928, of which application the present is a division, it will be understood that my invention is applicable to vulcanizers for molding and curing other articles.

Among the objects of my invention are the provision of a connection which shall be simple in operation, requiring no manual coupling of the connection to the valve of the tube or article and the improvement of the quality of the cured article through a positive control of the position of the valve stem with respect to the walls of the article. Other and further objects will be apparent from the following specification and claims.

In the accompanying drawing which illustrates one embodiment of my invention,

Fig. 1 is a front elevation of a vulcanizing mold equipped with my improved connection, and Fig. 2 is a section, on a larger scale, taken on line 2—2 of Figure 1, and showing the connection in operative relation with the valve stem of a tube.

Referring to Figure 1 of the drawing, a vulcanizing mold and its operating parts are shown mounted on a base 1 from which arise a pair of posts 2 and a third post 3 offset from the first two. Upper and lower slides 4 and 5, respectively, which carry the movable sections 7 and 8 of the mold are slidably mounted on posts 2. Embracing all three posts is a fixed frame 9 which carries the central stationary part 10 of the mold. Since my improved connection is independent of any particular form of vulcanizer further description of the vulcanizer mechanism shown is believed unnecessary other than to state that means are provided to separate the mold sections 7 and 8 from the central section as fully described in my copending application above referred to.

Upon a bracket 12 secured to the fixed frame 9 is a housing 14 having a conical seat 15 for centralizing the valve stem 16 of the tube 17. Sliding in the housing is a plunger 19 constantly urged upwards by a spring 20 and having a pointed top 21 entering into the end of the valve stem. An opening 22 extends the entire length of the plunger so that the interior of the valve stem is kept in communication with a tube 23 which joins the plunger to the pressure supply and control devices not shown. When a tube is placed in the mold for vulcanization its valve stem is projected through a radial hole in the central circular mold section and centers in the conical seat 15. The conical tip 21 of plunger 19 enters the end of the valve stem and adjusts itself by compression of the spring 20 so that a tight seal is obtained. Usually in the vulcanization of tubes in circular molds the valve stem is held in the tube merely by the elasticity of the rubber around the hole, the clamp nut which binds the valve stem to the tube in the finished article not having been applied at this stage of manufacture. The absence of any rigid bond permits the valve stem to slip relative to the tube, and to adjust itself to position even if its length is not quite standard. The internal pressure supplied to the tube during vulcanization presses the valve stem outwardly of the mold into tight engagement with seat 15 and plunger 21, and also presses the tube rubber tightly against the mold and valve stem, avoiding leaks at this point, housing 14, however, being so adjusted in bracket 12 as by a set screw 24 that the flange 25 on the inner end of the valve stem is kept just out of contact with the inner surface of the tube, preventing thinning of the tube at this point.

Having thus described my invention, I claim:

1. A fluid pressure connection for vulcanizing molds which comprises a support mounted in a predetermined fixed position with respect to the mold, a fluid conducting member carried by said support and adapted to engage the stem of an article positioned within the mold, a spring tending to move the conducting member relative to said support and into engagement with the stem, the resiliency of said spring being such as to yield against the pressure in the article acting against the stem and establish a fluid tight contact between the stem and said fluid conducting member, said support acting to limit the outward movement of the stem under the pressure within the article.

2. A fluid pressure connection for vulcanizing molds which comprises a housing, a fluid conducting plunger slidable within the housing, a spring tending to force the plunger outwardly of the housing into engagement with the stem of an article within the mold, the resiliency of said spring being such as to yield against the pressure in the article acting on the stem, and means to hold said housing in a predetermined fixed position with respect to the mold to limit the outward movement of the stem under the pressure within the article.

3. A fluid pressure connection for vulcanizing molds which comprises a cylindrical housing flared at one end to receive the end of the valve stem of an article within the mold, a plunger, having an unobstructed passage therethrough for the conduction of fluid pressure, slidably mounted within the housing, said plunger being adapted to be connected at one end to a source of fluid pressure and tapered at the other end to seat within the end of the valve stem, a spring surrounding the plunger within the housing and tending to force the plunger outwardly of the housing and into engagement with the valve stem, the resiliency of the spring being such as to permit outward movement of the valve stem with respect to the mold under the fluid pressure within the article, and means to hold the housing in a predetermined fixed relation with the mold to limit the outward movement of the stem with respect to the mold.

CHARLES EDGAR MAYNARD.